(12) United States Patent
Noble et al.

(10) Patent No.: US 9,002,642 B2
(45) Date of Patent: Apr. 7, 2015

(54) TRACK PREDICTION AND IDENTIFICATION VIA PARTICLE MOTION WITH INTENT

(75) Inventors: William B. Noble, Santa Monica, CA (US); Serdar N. Gokcen, Yorktown, VA (US); Michael D. Howard, Westlake Village, CA (US); David W. Payton, Calabasas, CA (US)

(73) Assignee: Raytheon Company, Waltham, MA (US)

( * ) Notice: Subject to any disclaimer, the term of this patent is extended or adjusted under 35 U.S.C. 154(b) by 1707 days.

(21) Appl. No.: 12/156,686

(22) Filed: Jun. 4, 2008

(65) Prior Publication Data

US 2009/0306894 A1    Dec. 10, 2009

(51) Int. Cl.
| | |
|---|---|
| G01S 13/88 | (2006.01) |
| G01S 13/72 | (2006.01) |
| G01S 7/41 | (2006.01) |
| G01S 13/87 | (2006.01) |
| G06Q 10/08 | (2012.01) |

(52) U.S. Cl.
CPC ............... G01S 13/723 (2013.01); G01S 7/415 (2013.01); G01S 13/878 (2013.01); G06Q 10/08355 (2013.01)

(58) Field of Classification Search
None
See application file for complete search history.

(56) References Cited

U.S. PATENT DOCUMENTS

| | | | | |
|---|---|---|---|---|
| 5,963,653 | A * | 10/1999 | McNary et al. | 382/103 |
| 6,507,771 | B2 * | 1/2003 | Payton et al. | 700/245 |
| 7,908,040 | B2 * | 3/2011 | Howard et al. | 701/1 |
| 2006/0015215 | A1 | 1/2006 | Howard et al. | |

* cited by examiner

Primary Examiner — Anita Coupe
(74) Attorney, Agent, or Firm — Christie, Parker & Hale, LLP

(57) ABSTRACT

Provided is a system and method for tracking and identifying a target in an area of interest based on a comparison of predicted target behavior or movement and sensed target behavior or movement. Incorporating aspects of both particle diffusion and mobility constraint models with target intent derivations, the system may continuously track a target while simultaneously refining target identification information. Alternatively, the system and method are applied to reacquire a target track based on prioritized intents and predicted target location.

18 Claims, 5 Drawing Sheets

| # | Type |
|---|---|
| 1 | Store |
| 2 | Warehouse |
| 3 | Housing |
| 4 | Checkpoint |
| 5 | Friendly Force |
| 6 | Embassy |
| 7 | Hospital |
|   |   |

FIG. 2

| # | Type | Max Speed (kph) | Max Hill Climb % | Min Hill Climb % | Off Road Factor |
|---|---|---|---|---|---|
| 1 | Train | 100 | 5 | 4 | 0 |
| 2 | Passenger Car | 135 | 15 | 18 | 0.1 |
| 3 | SUV | 125 | 25 | 22 | 0.5 |
| 4 | Large Truck | 80 | 15 | 15 | 0.2 |
| 5 | Tracked Vehicle | 80 | 45 | 45 | 1.0 |

FIG. 3

| # | Type | Initial Probability % | Applicable Vehicle(s) | Special Constraints |
|---|---|---|---|---|
| 1 | Neutral Civilian | 80 | 2,3 |  |
| 2 | Train | 50 (if on train track – adjust other probabilities accordingly) | 1 | On train track only |
| 3 | Hostile Force | 5 | 3,4,5 |  |
| 4 | Ambulance | 5 | 3 |  |
| 5 | Delivery | 5 | 3,4 |  |
| 6 | Terrorist | 5 | 2,3,4 |  |

FIG. 4

| # | Type | Store | Warehouse | Housing | Checkpoint | Friendly Force | Embassy | Hospital |
|---|---|---|---|---|---|---|---|---|
| 1 | Neutral Civilian | Attract | None | Attract | None | None | None | None |
| 2 | Train | None | Attract | None | None | None | None | None |
| 3 | Hostile Force | None | None | None | Avoid | Strongly Avoid | Attract | None |
| 4 | Ambulance | None | None | Attract | None | None | None | Strongly Attract |
| 5 | Delivery | Attract | Attract | Attract | None | None | Attract | Attract |
| 6 | Terrorist | None | None | None | Strongly Avoid | Strongly Avoid | Attract | None |

FIG. 5

TRACK PREDICTION AND IDENTIFICATION VIA PARTICLE MOTION WITH INTENT

FIELD OF THE INVENTION

This invention relates generally to modeling target behavior in an area of interest to track and identify the target. More particularly, this invention relates to improving particle intent and mobility constraint analyses to track a target, regardless of whether the track is continuous, and to identify the target with a high degree of confidence based on rule-based behavior and actual observed movements.

BACKGROUND

The prior art, to include U.S. patent application Ser. No. 10/892,747, filed Jul. 15, 2004, to Howard et al, "System and Method for Automated Search by Distributed Elements" (which is herein incorporated by reference) generally includes a number of methods for predicting the behavior of an object or "target" in a known environment or area of interest or area of operation ("AOR") using a set of particle filters, one for each hypothesized identity. These predictive methodologies are an algorithmic way to associate an identity and a geographic position estimate with a string of measurements representing a target, usually a moving target. It is important for the tracker to keep a single track associated with a single target because, over time, the track acquires additional attributes (either manually or automatically), including an identity affiliation (e.g. friend or foe) and kinematic information. The problem of single tracking has historically been made difficult by maneuvering targets, large numbers of targets, and targets in close proximity (such as target tracks that cross).

Two additional factors also contribute to the difficulty of maintaining a single track per target, specifically: (1) the highly maneuverable nature of ground targets; and (2) the intermittent coverage caused by either obscuration (such as mountains, buildings, tunnels or foliage), or by the need to divert surveillance attention elsewhere for some period of time. In order to adequately address these difficulties and minimize their impact, it would be helpful to have some idea of where the target being tracked is likely located at some time in the future, so that it can be reacquired and the track updated when coverage is again established. Alternatively, when target motion can be continually tracked, behavior models allow inference of the possible identity/intent of the target, allowing targets of interest to be separated from targets which are of no interest.

The current state of the art with regard to predictive tracking and identification of known or suspected targets includes one of two fundamentally distinct approaches. The first approach defines particles which can "diffuse" in an environment. Particles are initialized with a track state vector, and move with a velocity consistent with the state vector plus a random perturbation. The expectation is that when it is time to reacquire the track it will be near the location of one of the particles. Generally speaking, this approach works best in association with only very short duration tracking interruptions. The effectiveness of this method degrades rapidly when the duration of the interruption approaches a few minutes, primarily due to other factors beyond the basic track state vector which come to dominate the position of the target.

The second approach currently available constrains the search area by mobility. If the target is a vehicle on the ground, it will be able to travel on roads and to a lesser extent off roads, based on the mobility of the vehicle itself (e.g. ground clearance, hill climbing capability, max speed, etc.), and the properties of the terrain. Given information about a vehicle's capabilities and the terrain features, a mobility cost surface can be calculated. A simplistic form of the surface identifies areas that are passable ("go") and not passable ("no-go"). More elegant forms of the mobility cost surface may be used and may include such considerations as maximum/minimum speed and a mobility "cost" in terms of the difficulty and desirability to move in a certain direction. Clearly, a well calculated mobility cost surface can enhance and simplify the tracking analysis. For example, in very mountainous terrain mobility is severely limited for most if not all vehicle types, therefore, the search space required for tracking may be significantly constrained. Nonetheless, the methodology of mobility constraint is limited in its application, especially in areas where the terrain is basically flat and passable by most vehicles (for example, a flat desert area, or nearly any body of water).

It may be possible, in some applications of the prior art, to combine the concepts of particle diffusion and mobility constraint, so that particles are constrained by the mobility/cost surface to move preferentially in low cost directions, and to move with velocities constrained by the maximum velocity applicable to their current direction. Even with this combined, enhanced capability, the problems of track discontinuity and confidence in identification exist, particularly when a network of roads is present or when the cost surface is very uniform.

Hence a need exists for a method and system for target tracking and identification which will address one or more of the drawbacks identified above.

SUMMARY

The methods and systems herein disclosed advance the art and overcome problems articulated above by improving tracking models to take into account object intent and characteristics, and defined rules of behavior. The method produces predictions of the future locations of objects by matching their movements with a library of behaviors and uses the most plausible behaviors to infer intent. The position is then extrapolated based on the intent and mobility, rather than just on kinematics alone.

In particular, and by way of example only, according to an embodiment, a method of tracking a target is provided which includes: sensing a target in an area of interest; creating a set of particles to represent the sensed target; attributing to each particle a functional intent, wherein the probability density of the particles in the set of particles correlates to the expectation that the target has a particular intent; grouping the set of particles based on functional intent; defining at least one vehicle type having predetermined vehicle characteristics; identifying objects within the area of interest with which the target may interact; allocating to each object an attraction-repulsion factor for each functional intent; correlating functional intents, vehicle types, vehicle characteristics, and objects having attraction-repulsion factors with defined mobility constraints for the area of interest, to define at least one rule of behavior for each particle; applying the at least one rule of behavior to predict a movement and geographic location for each particle representing the object; and tracking the object in accordance with the predicted movement and geographic location for each particle. This embodiment predicts where targets of interest are likely to be after an interruption in coverage. The probability density of the particles corresponds to the expectation that the target has a particular intent.

Whether or not a specific target will be a target of interest will depend upon whether or not the particular intent is of interest.

In yet another embodiment, provided is a system for tracking and identifying a target is provided which includes: at least one sensor for sensing the target in an area of interest; a first database defining a population of vehicle types and corresponding vehicle characteristics; a second database identifying functional intents; a third database populated with objects in the area of interest having a predetermined attraction-repulsion factor, wherein the attraction-repulsion factor is related to a relationship between a given functional intent and a given object; and a processor for correlating sensed data and the first, second, and third databases with pre-determined mobility constraints to describe the target in terms of particles having predicted rules of behavior, and to track and identify the target based on a comparison of predicted particle behavior and sensed target behavior. This embodiment predicts the intent/identity of the target based on its behavior.

In still another embodiment, a system for tracking and identifying a target is provided which includes: a means for sensing the target in an area of interest; and a means for correlating and processing sensed data and information contained in pre-defined databases to track and identify the target based on a comparison of predicted target behavior and sensed target behavior wherein the target behavior is described in terms of particle densities, and further wherein rules of behavior are assigned to each particle defining a target, the rules of behavior being derived from a correlation of data and information in the databases, to include vehicle types and characteristics, target intent, objects to interact with the target, and selected target behavior.

BRIEF DESCRIPTION OF THE DRAWINGS

FIG. 2 is a table of objects located within the area of operation, according to an embodiment;

FIG. 3 is a table of vehicles and corresponding characteristics, according to an embodiment;

FIG. 4 is a table of functional intents attributable to a target, according to an embodiment;

FIG. 5 is a table of "rules of behavior" for a target, according to an embodiment;

DETAILED DESCRIPTION

Before proceeding with the detailed description, it should be noted that the present teaching is by way of example, not by limitation. The concepts herein are not limited to use or application with one specific type of method or system for tracking and identifying a target in an area of interest or area of operation ("AOR"). Of note, an AOR may be any defined geographic area in which it may be possible to detect and track a target. More specifically, the AOR may be defined, without limitation, as land, sea, subsurface, air or space-based. Thus, although the instrumentalities described herein are for the convenience of explanation, shown and described with respect to exemplary embodiments, the principles herein may be equally applied in other types of methods and systems for tracking and identifying a target.

Figure 1:
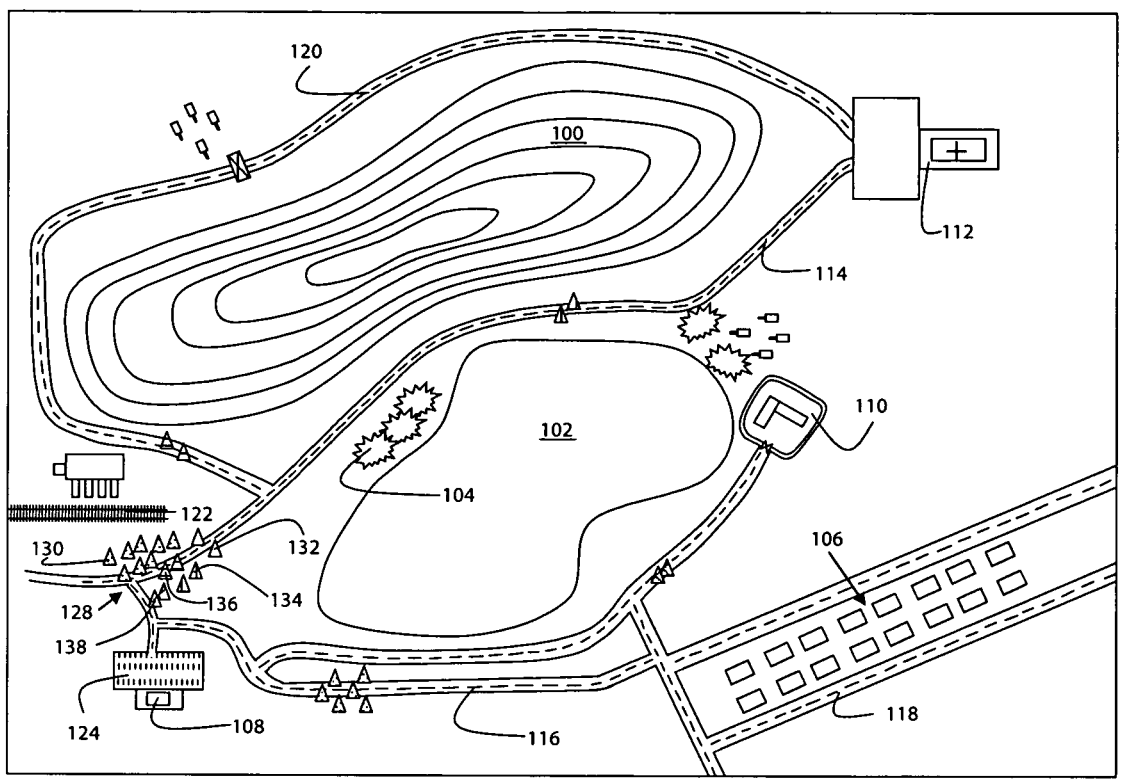
FIG. 1 is a plan view of a representative area of operation, according to an embodiment.

Within any given AOR, as represented by FIG. 1, there may be a number of varying topographical, as well as permanent, semi-permanent or temporary features and objects. As disclosed herein, there may also be targets that can move and change location within the AOR. If appropriate, a target may be classified as a "target-of-interest" requiring additional monitoring, tracking and identification. As shown in FIG. 1, some of the many topographical features or objects that may be present in an AOR include terrain of varying elevations (e.g. mountains or hills) 100, water (e.g. lakes, ponds, pools, rivers and streams) 102, and foliage 104, which may include such things as trees, shrubs, etc. Generally speaking, these features are considered "permanent" for the purposes of modeling their behavior and the behavior of targets interacting with each.

Man-made structures or objects, while primarily considered permanent, may also be modeled as semi-permanent or temporary if sufficient information exists to warrant such a classification. Objects in the AOR may include, but are not limited to, houses within a housing area 106, warehouses 108, private office buildings and the like, represented by the embassy 110 in FIG. 1, and public facilities such as a hospital 112. The types of objects depicted in FIG. 1 are by no means exhaustive, and any structure or object may be included as an item to be considered and modeled. Of particular note are objects that may be of interest to or objectives or goals for a target. As discussed in detail below, some or all of the objects in a given AOR may be considered destinations or goals for one or more of the targets or targets-of-interest, and may be an intermediate or final goal.

Still referring to the AOR of FIG. 1, other objects of concern may include roads of varying size, of which roads 114, 116, 118 and 120 are exemplary. Further, structural features such as railroads or railroad tracks 122 and parking areas 124 may also be objects that are included in the methodology disclosed herein. As noted above, FIG. 1 is representative of any AOR in which features, structures, buildings, roads, etc. (collectively "objects"), both natural and man-made, permanent and non-permanent, may be found to consistently or periodically interact with a target and impact, in some manner, the track and identification of a target. In a maritime AOR, structures would include port facilities and other infrastructure such as bridges.

An integral step in the track and identification methodology of the present application is the establishment and definition of databases containing information relevant to the AOR, the objects and features within the AOR, and the target or targets being tracked and identified. One such database, presented in FIG. 2, contains many of the various objects found in the AOR depicted in FIG. 1. For the purposes of illustration only, the database includes seven (7) different objects, each object being something with which a target may potentially interact. Importantly, the database of FIG. 2 contains only a limited number of objects, and any number of objects, both natural and man-made, may be included without departing from the scope of this disclosure.

In addition to the object database of FIG. 2, the elements of which are defined by the specific AOR, several other databases are included in the system of the present application. Unlike the object database disclosed above, these databases are populated with information that may contain a degree of uncertainty, such as an estimate, a recitation of information obtained from a third party source, a probability analysis, etc. For example, the vehicle database of FIG. 3 contains information regarding various types of vehicles that may operate within a given AOR. The expectation is that a target being tracked will typically fall within one of the categories of vehicles outlined in the database. Once again, for the purposes of simplicity and illustration, the information in the vehicle database of FIG. 3 is limited to a small number of vehicle types. It can be appreciated by those skill in the art that the database may contain any number of types of vehicles, and that the degree of specificity or fidelity within any database may vary. The vehicle database may also include general categories, including "unknown", or "truck" as well as specific types/models of vehicles.

As shown in FIG. 3, it is presumed that a target, if it is a vehicle, may be a: (1) train; (2) passenger car; (3) SUV; (4) large truck; or (5) tracked vehicle. For each of these vehicle types, certain characteristics are provided. The characteristics may be estimates or known (published) data, and may include for example: maximum speed (in kilometers per hour or miles per hour); maximum hill climb % or grade; minimum hill descent %; and an off-road factor. In at least one embodiment, the off-road factor is the value by which the on-road factors (e.g. speed, maximum and minimum hill climb %) are multiplied if the vehicle is not on a known roadway. Not surprisingly, in the example of FIG. 3, the off-road factor for a tracked vehicle is 1.0. This value derives from the fact that tracked vehicles are generally considered to be equally maneuverable on and off roads.

Yet another database integral to the present disclosure is the intent database. Referring now to FIG. 4, the term "intent" refers to a functional intent of a given target. Stated differently, the intent database broadly presents a "type" of target, which may be defined in terms of a function or action (e.g. Delivery), or in some cases a type classification halving a well known and expected intent (e.g. Ambulance or Train). For example, in FIG. 4 "terrorist" is identified as a type of target intent. In this context, the terms "terrorist" or "smuggler" suggest not only types of persons or targets, but also behaviors or functions, i.e. those acts or "intents" associated with a terrorist or with a smuggler. As with the previously disclosed databases, the intent database in FIG. 4 presents but a few of the possible functional intents which may be integrated into the system and methodology of the present application.

As shown in FIG. 4, the intent database may include additional information of interest such as a priori probability that a target has certain intents. The probability for a specific target may change as the track and related data processing continue. The intent database may also include information concerning which vehicle types would most likely be associated with a given intent, and any special movement limitations or other constraints. For example, a "delivery" intent is unlikely to be satisfied by a tracked vehicle, at least in the United States. Other information related to the intent of the target may be included in the database of FIG. 4 without departing from the scope of this disclosure.

The information contained in the various system databases may be manipulated and correlated to examine the role of "intent" in the routing, a path or trajectory of a vehicle that has been identified as a target, and potentially a target-of-interest. This correlation of information results in a compilation of postulated "rules of behavior" (FIG. 5) that may be attributed to each target. In particular, for each intent retrieved from the intent database (FIG. 4), a relationship between the intent and the objects in the AOR can be defined in terms of certain fundamental behaviors. More specifically, the fundamental behaviors or "rules of behavior" may include: Attract (the target is attracted to the object); Avoid (the target will attempt to avoid the object); Strongly Attract (the target is strongly attracted to the object); Strongly Avoid (the target will strongly attempt to avoid the object); and None (no rule exists with regard to the target and the object). For example, an ambulance (intent) will be strongly attracted (rule of behavior) to a hospital (object), but only attracted (rule of behavior) to a housing area (object). Further, the ambulance will have no rule of behavior specified with regard to a store. Similarly, a terrorist (intent) might strongly avoid (rule of behavior) a checkpoint (object), but will be attracted (rule of behavior) to an embassy (object). While the database presented in FIG. 5 is representative of the correlated rules of behavior, it is simply an illustration and not intended to limit the various possible intent-object-rule combinations.

Figure 6:
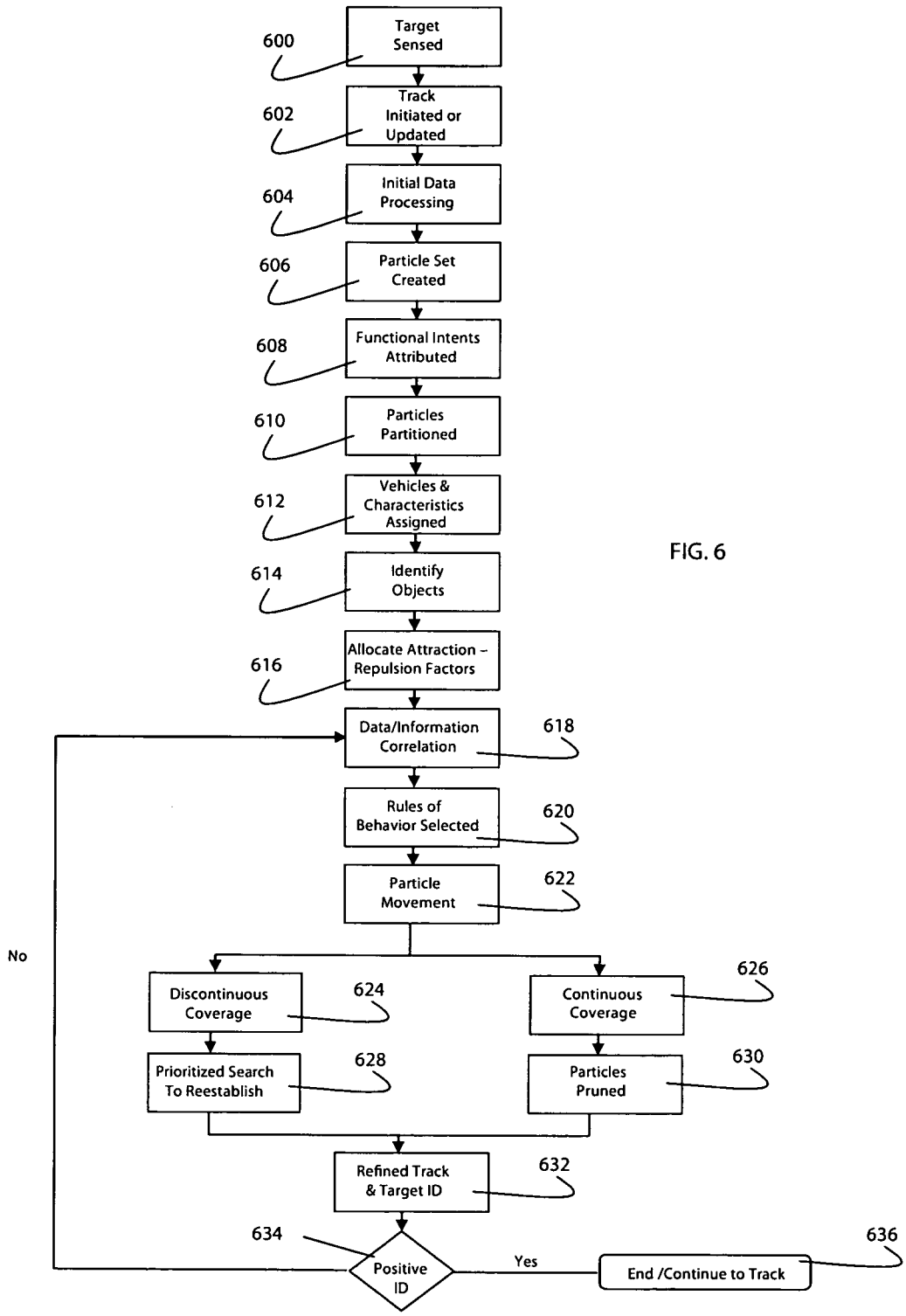
FIG. 6 is a flow chart of a method for tracking and identifying a target in an area of operation, according to an embodiment.

Cross-referencing now FIG. 6 with FIGS. 1-5, the methodology for tracking and identifying a target is defined. Initially, a target in the AOR is sensed (block 600) by human sighting or by a sensor that may be mounted on a platform, mobile, hand-held, fixed in position, including a device which may be mounted on the vehicle itself. By way of example, the sensor may detect the target via a reflected radio-frequency (RF) signal, thermal imagery, acoustic signal detection, etc. In summary, human sighting any sensor well known in the art may be used to sense the target.

Once the target is sensed, a track is initiated, block 602, and the processing of received data and database information begins, block 604. Concurrent with initial data processing, block 604, a set of "particles" is created in the software of the processing system, herein described, to represent the sensed target, block 606. One such group of particles is shown in FIG. 1 at 128. Each particle is attributed or assigned a functional intent from the predetermined intent database, e.g. the database of FIG. 4 (block 608). The probability densities of the particles are related to the probability that the target has a specific intent. For example, of a total probability of 100%, the probability may be that a sensed target has the intent of a neutral civilian (80%), a hostile force (5%), an ambulance (5%), a delivery (5%) or a terrorist (5%). Hence, 80% of the particles created will be assigned the neutral civilian intent, 5% will be assigned the hostile force intent, and so forth. Once functional intents are attributed to each particle, the set of particles is grouped according to those intents, block 610. As shown in FIG. 1, for particle set 128, the neutral civilian particles 130 are generally grouped together, as are the hostile force particles 132, the ambulance particles, 134, the delivery particles 136 and the terrorist particles 138.

For a given target track, potential vehicle types are defined along with the corresponding vehicle characteristics, block 612. These vehicle types are typically selected from a predetermined database such as the database of FIG. 3, and for the target in question may represent the entire database or a subset thereof. In at least one embodiment, the vehicle and corresponding characteristics are specified by an operator or user at the time of track initiation.

Similar to the definition of potential vehicle types, the objects in the AOR (such as those presented in the object database of FIG. 2) that may be relevant as a destination or goal for the target are identified, block 614. As with the other forms of information required to track and identify the target, the objects of concern may be selected from the predetermined database. Each object is allocated an "attraction-repulsion" factor for each of the functional intents attributed to the one or more particles, block 616. The attraction-repulsion factor may be thought of as a "force field" or gradient around the object. A simplistic example of this allocation may be that a hospital will have a relatively high attraction factor, as that factor relates to the intent "ambulance" presented in FIG. 4. By contrast, a friendly force will be allocated a strong repulsion factor, as that factor relates to the intent "terrorist" or "smuggler." The example provided herein is a simplified approach for the purposes of illustration, and the attraction-repulsion factor used to actually track and identify targets (and targets-of-interest) may be as complex and detailed as desired.

Once the databases for objects, intents, and vehicle types are populated with the data necessary to conduct the tracking/identification analysis, a correlation of the data is performed, taking into account any and all mobility constraints that may be known and specified for the particular AOR (block 618). In at least one embodiment, mobility constraints are related to topographical features within the AOR, varying road and man-made object restrictions, and known vehicle characteristics and capabilities. With regard to topographical features, in addition to the more obvious restrictions posed by steep elevation, water that cannot be forded, etc., terrain specifics such as soil type, hydrology, and others may be considered, and a mobility cost surface may be calculated. The same may be said with respect to maritime applications, both surface and subsurface, wherein surface and subsurface topographical features such as islands, channels, reefs, shoals and subsurface peaks and valleys may present mobility constraints.

The correlation of populated databases and the mobility cost surface leads to the definition of one or more "rules of behavior" for each particle having a particular intent (see e.g. FIG. 5), block 620. The "rule based" movement of the present disclosure, derived from particle (object) intent, provides a higher degree of track prediction fidelity and confidence, as opposed to simple movement based on random motion or even random motion constrained by a mobility cost surface. Particles are moved, as part of the tracking process, based on predictions calculated consistent with the rules of behavior, block 622, For example, referring once again to FIG. 1, in a second set of particles containing particles with the intent of "neutral civilian", particles with the intent of "ambulance", particles with the intent of "delivery", and particles with the intent of "terrorist", each grouping or partitioning of particles has moved within the AOR based on the rules of behavior established in accordance with the present disclosure. The "neutral civilian" particles have predictably moved along a route that will take toward the housing area, which is consistent with the rules outlined in FIG. 5, i.e. a housing area attracts a neutral civilian. Similarly, the "delivery" particles have been predicted to move along an equally innocuous route. The predicted path of the ambulance, in accordance with the calculated rules of behavior, is a direct route toward the hospital, while those particles identified as terrorist move toward the embassy while avoiding, as best they can, checkpoints, friendly forces, etc.

The predicted movement of the various intent-based particles, representing one or more targets in the AOR, can be used in at least two operational scenarios of interest: interrupted or discontinuous coverage track (block 624); and continuous coverage leading to a refinement of intent(s) attributed to a given target in the AOR (block 626). In the case of an interrupted track, the search to re-establish the track can begin with the locations predicted for the most important or significant intents (e.g. terrorist), and the search may proceed later to other potential particle locations relative to the targets in the scene, block 628. In this manner, the operational needs of reacquiring the more important targets, which have likely been classified as "targets-of-interest", are met through an expeditious and efficient search methodology.

With regard to coverage that is maintained or is continuous, those particles whose predicted behavior does not correspond to the tracked behavior of the corresponding target in the AOR may be "pruned" (block 630) via a pruning function. As particles are pruned, or deleted from the analytical process, the probability associated with their intent is decremented. Likewise, the probability of the remaining intents is increased, and new particles are created or spawned, in software, thereby keeping the number of particles constant and the ratios matching the intent probabilities. Over time, with any number of analysis iterations, this process of pruning will result in the probability that a particular tracked target has a certain intent, as represented by the distribution of particles associated with the particular track. The probability distribution may change with each iteration of the methodology outlined above, leading eventually to a refinement of the tracking and identification of the target, block 632. As shown in FIG. 6, the process may be iterative, as particles are moved and compared to "observed" target movement. A decision point is reached, when the identification of the target is questioned, block 634. If positively identified, e.g. one particular intent has a sufficiently high probability, the process may end or the track of the known target may continue, block 636. Otherwise, data correlation continues and the process of tracking and identifying follows suit. This may include, in at least one embodiment, refining one or more rules of behavior. As more and more iterations occur, the level of confidence in the identity of a particular target increases, and, once a certain level of identification probability or confidence threshold is attained, the data can be used in making decisions related to the target of interest. The identification may then, ultimately, be confirmed by actual observation of the target by one or more sensors having that capability.

Of note, the methodology disclosed herein represents one embodiment of the present application. It can be appreciated that the ordering of steps associated with the methodology may vary in one or more embodiments, without departing from the scope and intent of the disclosure. Depending on the operational needs of an end user, the sophistication of the sensor and processing equipment available, the time allotted for tracking and identification, etc., certain steps may be omitted completely or they may be repeated one or more times in the same, or a different, sequence.

The methodology described above may be categorized as a "stateless" approach, which is to say no consideration is given to where a target has been when determining where the target may move within the AOR. The known "state" of the target is irrelevant. In at least one embodiment of the present application, a variation on this basic estimating approach may be employed (see FIG. 7). For example, in the case of a target that is predicted to be an ambulance, consideration may be given to how an actual ambulance will behave under "normal" circumstances. In particular, an ambulance will normally be attracted to its source object, i.e. a hospital, only after visiting the site of an injury. Similarly, a school bus will be attracted to a school only after spending time wandering in and around a neighborhood following a well known route. Incorporation of these previous acts, or known "states", into the intent estimator discussed above (thereby making it a conditional probability calculator) may be beneficial in distinguishing "normal" behavior from "unusual" or even hostile behavior. This, in turn, may assist in user decision making and confident identification of a target.

Figure 7:
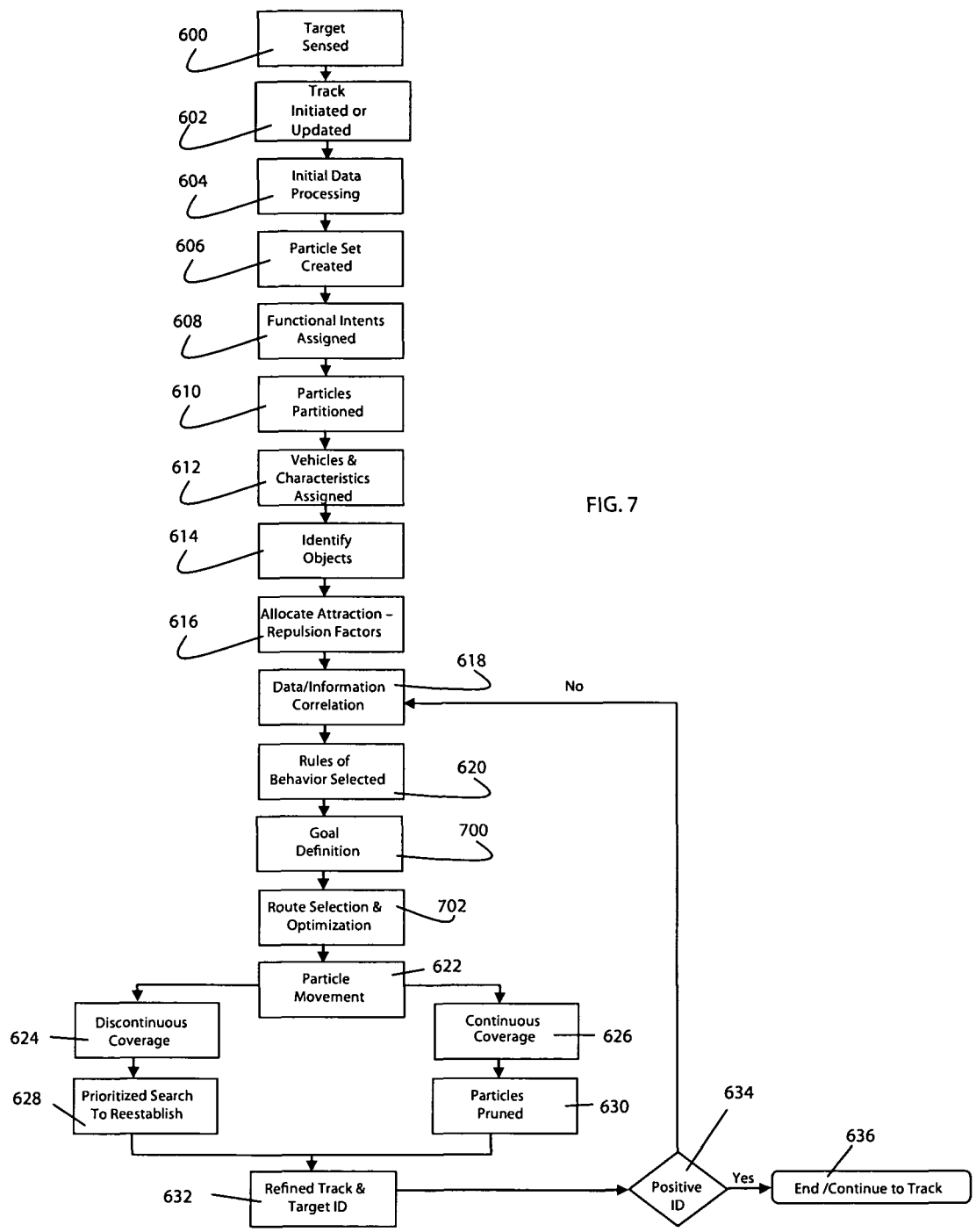
FIG. 7 is a flow chart of a method of tracking and identifying a target in an area of operation, according to an embodiment.

In particular, and referring now to FIG. 7 which is a modification of the methodology presented in FIG. 6, the software model is a finite state machine wherein each state contains a set of attractors/repulsors having a known attraction-repulsion factor, e.g. block 616 (FIG. 6). The model chooses or defines a goal from a predetermined goal set, block 700. Of note, a goal set is set of attractors, only one of which is active for a particular particle at a particular time. Many particles, having the same or different intents, may have the same goal within a goal set, and a goal set must have one or more attractors within it. For example, for an empty ambulance the goal selected from the goal set may be an "accident", whereas for a full fuel truck the goal may be a "gas station". In the case of an ambulance, once a goal (accident) is reached, the goal set changes to hospitals. In the case of the full fuel truck, once it has dispensed some gas at one gas station, it may choose to go to a second or third station, all within the same goal set.

Once a goal is chosen from the predetermined goal set, the model uses the goal, in conjunction with the mobility cost surface and the attraction-repulsion factors, to identify routes that reach the goal, block 702. The chosen route may be optimal or suboptimal; however, in all instances it will be a feasible route that achieves the chosen goal. In at least one embodiment, the model includes a preference for optimization in terms of cost, which may result in the selection of a path or route which is otherwise suboptimal. In this context, cost may be a financial consideration, or it may be any system, operational, etc. cost as defined by the model, the user, and the route selected for each particle.

Other "behaviors" or states may be selected for a particle in the methodology and corresponding model. For example, a limitation or definition of speed may be imposed on one or more particles representing a target. Alternatively, there may be a probability, which may be varied, that a particle will divert from a chosen goal to a different goal (route diversion) or will exercise hazard avoidance. In each instance, whether utilizing the "stateless" approach of FIG. 6 or the modified "state" methodology of FIG. 7, random perturbations of particle movement may be included as part of the analytical process. The degree to which random movement drives a given tracking and identification solution set may depend, in part, on the maturity of the analysis and/or the specified desires of the user.

A system for effecting the methodologies disclosed herein may include one or more sensors for sensing or detecting a target. As noted above, the sensors may be any of a kind well known in the art operating in one or more bands of the electromagnetic spectrum (e.g. visible, near-IR, far-IR, acoustic, RF, and may include mechanisms mounted on the vehicle itself for reporting pertinent information related to it. Additionally, the system may include some or all of the databases discussed above, to include vehicle types and characteristics, functional intents, objects having attraction-repulsion factors, etc. A processor is necessary to store the relational databases, receive sensed data from a single or multiple sources, to correlate data and predict particle movement. The results of multiple iterations of the analysis may be stored in the processor. As disclosed above, the system may include one or more finite state machines further comprising one or more finite state machines for modeling target behaviors, wherein those behaviors may be selected from a group consisting of: goal achievement, goal modification, target speed, route diversion, and hazard avoidance.

Changes may be made in the above methods, systems, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A method of tracking a target executed by one or more processors, comprising:

sensing, by a sensor, a target in an area of interest, the target having a type and the type having at least one mobility constraint associated therewith;

creating, by one or more processors, a set of particles to represent the sensed target;

attributing, by the one or more processors, to each particle a functional intent, wherein a probability density of the particles in the set of particles correlates to a probability the density of possible intents that guide movements of the sensed target, and wherein the functional intent of a specific particle is a combination of behavioral goals of a person guiding the sensed target and the mobility constraint of the type of the sensed target;

grouping, by the one or more processors, the set of particles based on attributed functional intents;

defining at least one vehicle type having predetermined vehicle characteristics;

identifying, by the one or more processors, objects within the area of interest with which the sensed target may interact;

allocating, by the one or more processors, to each object an attraction-repulsion factor for each functional intent;

correlating, by the one or more processors, functional intents, vehicle types, vehicle characteristics, and objects having attraction-repulsion factors with defined mobility constraints for the area of interest, to define a rule of behavior for each particle having a particular intent, wherein said rule of behavior defines a relationship between the functional intent of a particle and the objects within the area of interest;

applying, by the one or more processors, said rule of behavior to each particle to predict a movement and geographic location for each particle representing the sensed target; and moving, by the one or more processors, each particle representing a predicted location of the target in accordance with the observed movements of the sensed target, said rule of behavior applied to each particle and geographic location for each particle.

2. The method of claim 1, further comprising categorizing, by the one or more processors, particles of like functional intent as a target-of-interest.

3. The method of claim 2, further comprising:

pruning particles not categorized as a target-of-interest, by the one or more processors;

creating, by the one or more processors, additional particles such that the number of particles pruned and the number of particles additionally created are equal; and distributing, by the one or more processors, created particles to modify functional intent probabilities.

4. The method of claim 1, further comprising comparing, by the one or more processors, the predicted movement and geographic location for each particle of like functional intent to a known movement and geographic location for the target to identify the functional intent of the target.

5. The method of claim 1, wherein the target is land based.

6. The method of claim 1, wherein sensor coverage of the target is discontinuous, and wherein a reacquisition of the tracked target is desired.

7. The method of claim 6, further comprising:

establishing a priority for each functional intent; and initiating, by the one or more processors, a reacquisition of the target based on functional intent priorities.

8. The method of claim 1, further comprising:

selecting a goal for each particle representing a functional intent; and applying, by the one or more processors, mobility constraints and attraction-repulsion factors to define at least one route for reaching the goal.

9. The method of claim 8, further comprising optimizing the route, by the one or more processors.

10. The method of claim 8, further comprising incorporating a probability that a particle will divert from a chosen goal to a different goal, by the one or more processors.

11. The method of claim 1, further comprising apportioning to each particle a selected behavior, by the one or more processors.

12. The method of claim 11, wherein the selected behavior is chosen from a group consisting of: speed, route diversion, and hazard avoidance.

13. A system for tracking and identifying a target, comprising:
at least one sensor for sensing the target in an area of interest, the target having a type and the type having at least one mobility constraint associated therewith;
a first database residing on a first computer storage medium and including a plurality of vehicle types and corresponding vehicle characteristics;
a second database residing on a second computer storage medium and including a set of particles to represent the sensed target and a plurality of functional intents attributed to each vehicle type, wherein the set of particles are grouped to represent the sensed target, and wherein a probability density of the particles in the set of particles correlates to a probability the density of possible intents that guide movements of the sensed target, and wherein the functional intent of a specific particle is a combination of behavioral goals of a person guiding the sensed target and the mobility constraint of the type of the sensed target;
a third database residing on a third computer storage medium and populated with objects in the area of interest having a predetermined attraction-repulsion factor, wherein the attraction-repulsion factor is related to a relationship between a given functional intent and a given object; and
a processor
for correlating functional intents, vehicle types, vehicle characteristics, and objects having attraction-repulsion factors in the first, second, and third databases with pre-determined mobility constraints for the area of interest;
for defining a rule of behavior for each particle having a particular intent, wherein said rule of behavior defines a relationship between the functional intent of a particle and the objects within the area of interest;
for applying said rule of behavior to each particle to predict a movement and geographic location for each particle representing the sensed target; and
for moving each particle representing a predicted location of the target in accordance with the observed movements of the sensed target, said rule of behavior applied to each particle and geographic location for each particle.

14. The system of claim 13 wherein the at least one sensor covers the target in a discontinuous manner, and wherein the track of the target is initiated using predetermined priorities for each functional intent.

15. The system of claim 13, wherein the processor further performs a pruning function for eliminating particles.

16. The system of claim 13, further comprising one or more finite state machines.

17. The system of claim 16, wherein the one or more finite state machines target behaviors selected from a group consisting of: goal achievement, goal modification, target speed, route diversion, and hazard avoidance.

18. The system of claim 13, wherein the target is selected from one or more of a group consisting of: at least one land based target, at least one sea based target, at least one air based target, and at least one space based target.

* * * * *